INVENTOR
Wolfgang RIEDEL

By his ATTORNEY

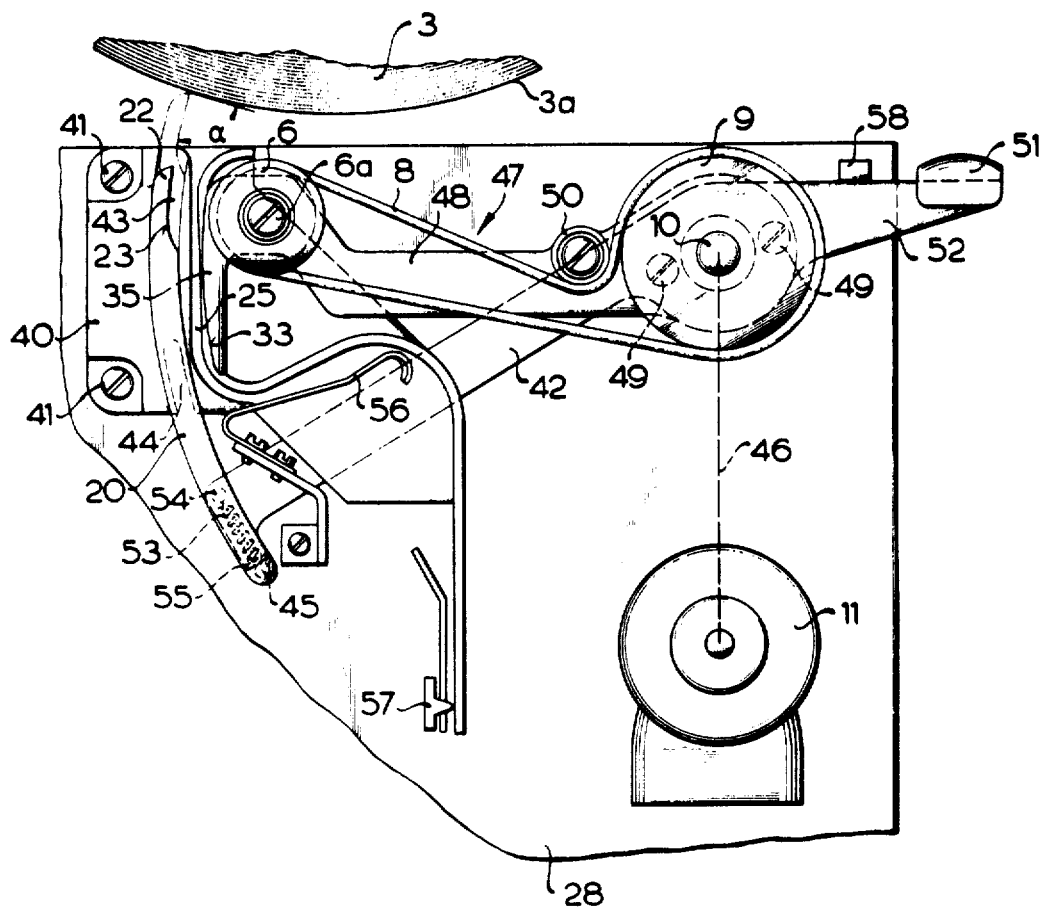

@# United States Patent Office 3,672,754
Patented June 27, 1972

3,672,754
FILM THREADING MECHANISM FOR USE IN
MOTION PICTURE PROJECTORS OR THE LIKE
Wolfgang Riedel, Winnenden, Germany, assignor to
Silma S.p.A., Turin, Italy
Filed Jan. 21, 1971, Ser. No. 108,406
Claims priority, application Germany, Jan. 27, 1970,
P 20 03 448.4
Int. Cl. G03b 1/58
U.S. Cl. 352—158
14 Claims

ABSTRACT OF THE DISCLOSURE

A threading mechanism for the leader of motion picture film in a motion picture projector has a drive for rotating the supply reel in a direction to pay out the film at the will of the operator. The drive has a shaft which is driven by an electric motor and transmits torque to a friction wheel mounted on a carrier which is pivotable about the axis of the shaft to move the friction wheel into and out of engagement with the outermost convolution of film on the supply reel. The carrier further supports two film directing members having surfaces which define an arcuate path for directing the leader of motion picture film into the channel of a fixed film guide assembly. One of the film directing members is located between the other film directing member and the friction wheel, and the other film directing member has a tip which is movable into engagement with the outermost convolution to intercept the leader and to direct the thus intercepted leader into the path between the surfaces of the two film directing members when the friction wheel drives the supply reel. The other film directing member is connected to the carrier by an elastic coupling which insures that the carrier can move the friction wheel into engagement with the outermost convolution even if such outermost convolution is engaged by the tip of the other film directing member prior to engagement between such outermost convolution and the friction wheel.

CROSS-REFERENCE TO RELATED APPLICATION

The film threading mechanism of the present invention constitutes an improvement over and a further development of the film threading mechanism which is disclosed in my copending application Ser. No. 82,606 filed Oct. 21, 1970 and entitled "Mechanism for Threading Motion Picture Film in Cinematographic Apparatus."

BACKGROUND OF THE INVENTION

The present invention relates to improvements in mechanisms for threading motion picture film in cinematographic apparatus, especially in motion picture projectors, and more particularly to improvements in automatic or semiautomatic film threading mechanisms which can be used to direct the leader of a roll of convoluted motion picture film a desired path for lengthwise movement toward a takeup reel and past several components of the apparatus, such as a claw pull-down or other film feeding means, a film gate, one or more film looping devices and/or others.

The aforementioned copending application Ser. No. 82,606 discloses a film threading mechanism wherein a friction wheel is movable into engagement with the outermost convolution of a roll of motion picture film which is convoluted on a supply reel, and wherein the means for deflecting the leader of film into the channel defined by a fixed film guide includes two preferably rail-shaped reciprocable film directing or deflecting members which are movable substantially radially of the axis of the supply reel. An advantage of such mounting of the film directing members is that their film directing or deflecting action is not dependent on the diameter of the roll of motion picture film on the supply reel. One of the film directing members has a tip which is movable into direct engagement with the outermost convolution of film to intercept the leader and to cause the leader to enter a path which is defined by two elongated surfaces of the film directing members. The leader is caused to move in such path lengthwise and is automatically introduced into the channel of the stationary film guide to move toward the core of the takeup reel. The two film directing members are mounted on separate parts and are movable independently of each other between operative and retracted positions. The friction wheel of the drive which rotates the supply reel in a direction to pay out the film need not perform any film-guiding functions because such functions are performed by the two film directing members which are movable lengthwise and radially of the supply reel. This insures that the width of the path defined by the surfaces of the film directing members need not change when a reel containing a relatively long motion picture film is replaced with a reel carrying a relatively small roll of convoluted film or vice versa. Since the friction wheel need not guide the leader of the film during unwinding, the drive for the supply reel can be simplified and rendered more reliable than the drives of earlier film threading mechanisms.

It was found that, in certain types of cinematographic apparatus wherein all component parts must be accommodated in a relatively small housing, the longitudinally movable substantially straight film directing members occupy a relatively large part of the interior of the housing, especially if the projector is to use very large as well as very small rolls of convoluted motion picture film.

SUMMARY OF THE INVENTION

An object of the invention is to provide a film threading mechanism, particularly for use in motion picture projectors, which is even more compact and simpler than the mechanism of my aforesaid copending application.

Another object of the invention is to provide an automatic or semiautomatic film threading mechanism for motion picture film with novel and improved drive means which is used to rotate the supply reel in a direction to pay out the film while the leader of the outermost convolution of motion picture film is being deflected and transported at least part of the way toward the takeup reel.

A further object of the invention is to provide a film threading mechanism which renders it possible to achieve substantial reductions in the dimensions of the housing of a cinematographic apparatus.

An additional object of the invention is to provide a compact and relatively simple film threading mechanism which is capable of properly guiding the leader of motion picture film which forms on the supply reel a relatively large, medium-sized or relatively small roll.

Another object of the invention is to provide a film threading mechanism wherein a single manipulation (either by hand or by remote control) suffices to activate the drive for the supply reel and the means which causes the leader of convoluted motion picture film to enter into and to advance along a predetermined path independently of the diameter of the outermost convolution of the film on the supply reel.

The invention is embodied in a cinematographic apparatus, particularly in a motion picture projector, which comprises a housing, a supply of convoluted motion picture film rotatably supported by the housing (such supply is preferably convoluted on the core of a supply reel which can be installed in a cassette capable of being rapidly attached to or detached from the housing) and having a leader which constitutes the free end of the outermost convolution of the supply of film, and a novel film threading mechanism which comprises drive means for rotating the supply of convoluted film in a direction to pay out the film, preferably arcuate first film directing means having a film engaging portion pivotable about a predetermined axis against the outermost convolution of the supply of film and a first film directing surface arranged to guide the leader subsequent to engagement between the leader and the film engaging portion while the drive means rotates the supply in a direction to pay out the film, and second film directing means pivotable toward the outermost convolution of the supply of film about the pivot axis for the first film directing means and having a second film directing surface defining with the first surface a path wherein the leader of film is advanced in a predetermined direction (preferably into a channel defined by a stationary film guide assembly) in response to rotation of the supply of film.

The pivot axis for the two film directing means is preferably defined by a component part of the drive for the supply of film and this drive preferably comprises a friction wheel or an analogous driving element for the supply of film which can be mounted on a common pivotable carrier for the two film directing means.

The novel features which are considered as characteristic of the invention are set forth in particular in the appended claims. The improved film threading mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a similar schematic side elevational view but showing the film threading mechanism in the inoperative position.

DESCRIPTION OF THE PREFERRED EMBODIMENTS

Figure 1:
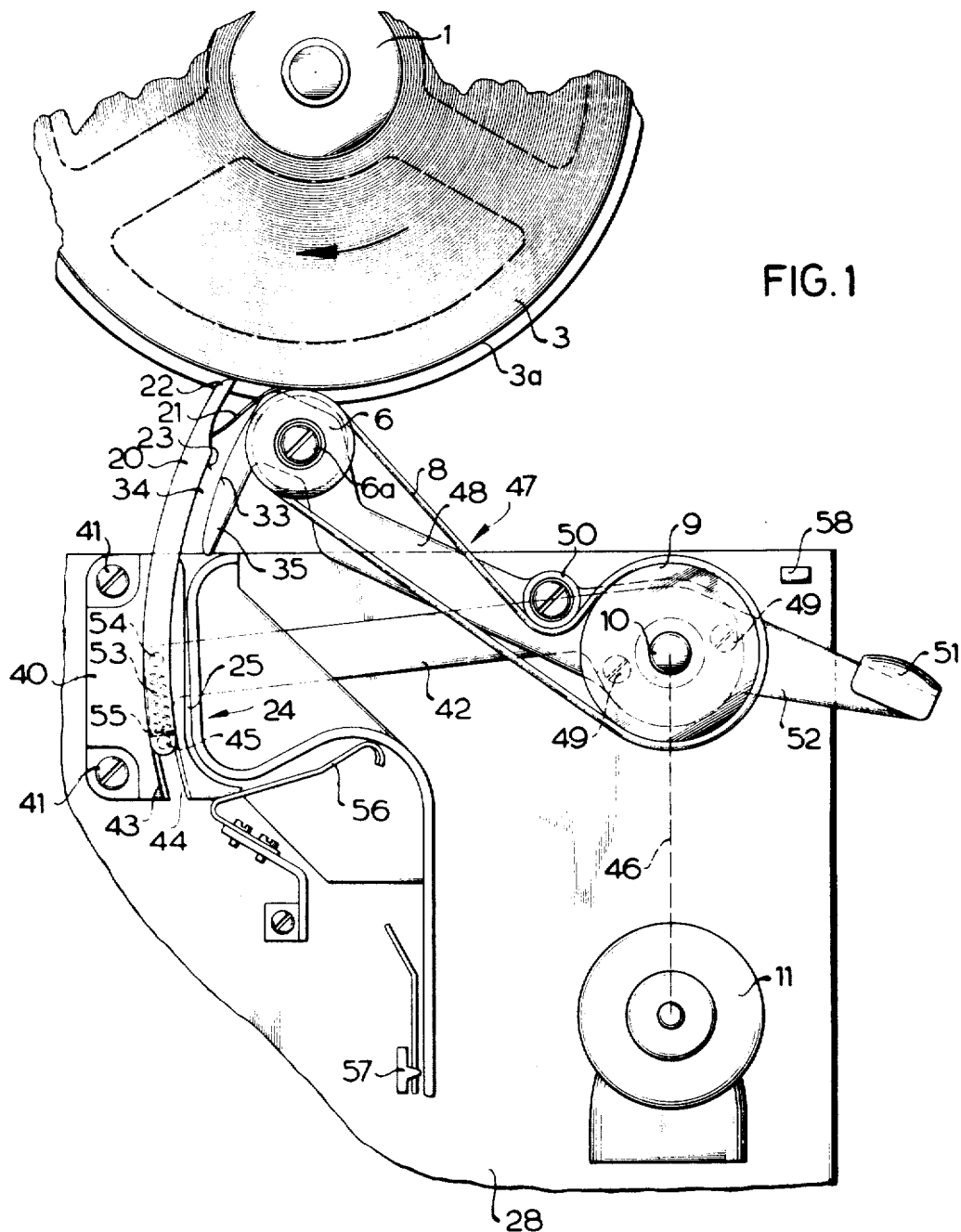
FIG. 1 is a schematic side elevational view of a portion of a motion picture projector which embodies the improved film threading mechanism, the latter being shown in the operative position.

For the sake of convenience, those parts of the cinematographic apparatus of the present invention which are identical with or clearly analogous to the parts of apparatus shown in the drawing of my aforementioned copending application Ser. No. 82,606 are denoted by similar reference characters.

The numeral 20 denotes in FIGS. 1 and 2 a first or main film deflecting or directing member which can be moved from the retracted or idle position of FIG. 2 to the extended or operative position of FIG. 1 to thereby intercept the leader 21 of a supply of convoluted motion picture film 3 stored on a supply reel whose core is indicated at 1. The supply reel can be mounted in a cassette or magazine (not shown) which is detachably secured to the housing of the cinematographic apparatus and is open from below. In order to pay out the film 3, the core 1 must be rotated in a clockwise direction as indicated by the arrow. The blade- or wedge-like film-engaging portion or tip 22 of the film directing member 20 can be caused to bear against the outermost convolution 3a of the film 3 on the core 1 and, when the supply of film is rotated in a clockwise direction, the edge of the tip 22 intercepts and deflects the leader 21 so that the latter is compelled to move along the concave surface of the tip 22 and thereupon slides along a concave film directing surface 23 of the member 20. The surface 23 causes the leader 21 to advance along a predetermined path 34 and in a predetermined direction, namely, toward the inlet of a relatively narrow channel 25 in a stationary film guide assembly 24. The film guide assembly 24 includes a fixedly mounted plate 40 which defines the channel 25. The plate 40 is secured to a wall 28 which forms part of the housing of a motion picture projector. The means for connecting the plate 40 to the wall 28 comprises screws 41 or analogous fasteners which can carry distancing elements (not shown) so as to insure that the parts 28 and 40 are parallel to and separated from each other by a gap wide enough to accommodate with some clearance a portion of an arm 42 which movably supports the film directing member 20. To this end, the plate 40 is provided with an arcuate recess 43 wherein the member 20 is slidable between the positions shown in FIGS. 1 and 2. The recess 43 communicates with a slot 44 formed in the plate 40 and serving to receive and guide a follower pin 45 at the rear or lower end of the film directing member 20. The follower pin 45 extends into the slot 44 when the tip 22 of the member 20 engages the outermost convolution 3a of the supply of film 3 on the core 1.

In order to insure that the leader 21 invariably enters the inlet of the channel 25 when the supply of film 3 rotates in a clockwise direction, the film threading mechanism further comprises a second film directing or deflecting member 35 having a convex film directing surface 33 which defines with the surface 23 of the member 20 the aforementioned path 34. In the illustrated embodiment, the width of the path 34 between the film directing surfaces 23, 33 of the members 20, 35 exceeds the width of the channel 25. The second film directing member 35 is mounted upstream or ahead of the member 20, as considered in the direction in which the core 1 must rotate in order to pay out the film 3. The surface 35 is located between the surface 23 of the member 20 and a friction wheel or roller 6 constituting the driving element of a drive which can rotate the core 1 in a clockwise direction in order to move the leader 21 into the range of the tip 22 and to cause the leader to advance in the path 34, thereupon in the channel 25, and on toward a takeup reel, not shown.

In accordance with a feature of the invention, the film directing members 20, 35 are pivotable about a common pivot axis defined by a horizontal shaft 10 which can be said to form part of the aforementioned drive and is rotatable in two directions by a transmission 46 (indicated by broken line) which is driven by a reversible electric motor 11 mounted on the wall 28 or on another stationary part of the housing of the cinematographic apparatus. The motor 11, the transmission 46 and the shaft 10 constitute additional component parts of the drive whose driving element 6 can be moved into engagement with the outermost convolution 3a of the supply of film 3 on the core 1. The shaft 10 serves as a pivot for a carrier 47 having a first portion or arm 48 which supports the shaft 6a of the driving element 6 and the film directing member 35, and a second portion or arm 42 which, as mentioned above, movably supports the film directing member 20. The arms 42, 48 are rigidly connected to each other by means of screws 49 or analogous fasteners, and the film directing member 35 is shown as being integral with the arm 48.

In the illustrated embodiment, the shaft 10 is located ahead of the film directing members 35, 20, as considered in the direction of rotation of the core 1 to pay out the film 3. This brings about the advantage that the angle alpha (FIG. 2) between a plane extending tangentially of the outermost convolution 3a at the point where the edge of the tip 22 contacts the convolution 3a and the concave surface of the tip 22 increases with decreasing diameter of the roll of convoluted film 3 on the core 1. Thus, in FIG. 1 which shows a film roll of smaller diameter, the angle alpha is larger than the angle alpha shown in FIG. 2 which shows a film roll of greater diameter. The larger the angle alpha, the better is the deflecting and guiding action of the film directing member 20.

The aforementioned drive for the roll of film 3 on the core 1 further comprises an endless belt or cord 8 which is trained over the driving element 6 and over a pulley 9 secured to and coaxial with the shaft 10. The periphery of the driving element 6 can be provided with a circumferential groove for the belt 8 which is tensioned by a tensioning roll 50 mounted on the arm 48 of the carrier 47. The actuating means for pivoting the film directing member 20 and the driving element 6 into and from engagement with the outermost convolution 3a of the roll of film 3 on the core 1 comprises a depressible knob 51 which is mounted on a third arm 52 of the carrier 47 and is accessible from the exterior of the housing of the cinematographic apparatus. The weight of the arms 42, 48, driving element 6 and film directing members 20, 35 suffices to insure that the carrier 47 returns to the starting or idle position of FIG. 1 under the action of gravity as soon as the pressure upon the knob 51 is terminated.

The movability of the film directing member 20 with reference to the member 35 and driving element 6 (i.e., with reference to the arms 42, 48 of the carrier 47) serves to insure that the edge of the tip 22 invariably engages the outermost convolution 3a when such convolution is engaged by the driving element 6. As mentioned before, the member 20 is movable in an arcuate recess 43 defined by the plate 40 and having its center of curvature on the axis of the shaft 10. A yieldable coupling between the arm 42 and the member 20 comprises a resilient element here shown as a helical spring 53 one end of which is attached to a post 54 of the arm 42 and the other end of which is attached to the follower pin 45 so that the spring 53 urges the member 20 upwardly, as viewed in FIGS. 1 and 2, and toward an abutment or stop 55 at the lower end of the outermost portion of the arm 42. The stop 55 may constitute a bent-over portion or lug of the arm 42.

The customary film feeding claw pull-down is shown at 57. The numeral 56 denotes a leaf spring which forms part of the film guiding assembly 24. A projection or stop 58 on the wall 28 serves to arrest the arm 52 of the carrier 47 when the parts 20, 35, 6 assume the inoperative or retracted positions of FIG. 2.

The operation:

When the film threading mechanism is idle, its parts assume the positions shown in FIG. 2. The arm 52 of the carrier 47 abuts against the stop 58 and the driving element 6 is disengaged from the outermost convolution 3a of the film roll on the core 1. The tip 22 of the film directing member 20 is also disengaged from the film and its pin 45 is located at a level below the slot 44 of the plate 40.

If the user of the projector wishes to start automatic threading of the film 3 and the attachment of its leader 21 to the core of the takeup reel, the electric motor 11 is started so that the transmission 46 drives the shaft 10 and the pulley 9 whereby the pulley 9 drives the belt 8 which rotates the driving element 6 in a counterclockwise direction. The user thereupon applies pressure against the knob 51 to pivot the carrier 47 in a clockwise direction about the axis of the shaft 10 until the driving element 6 engages the outermost convolution 3a. Such position of the driving element 6 is shown in FIG. 1. At the same time, the edge of the tip 22 of the film directing member 20 engages the outermost convolution 3a at a point located past the line of engagement between the film and the driving element 6. If the tip 22 engages the convolution 3a before the latter is engaged by the element 6, the spring 53 expands as the post 54 moves away from the follower pin 45 in response to further pivotal movement of the carrier 47 in a clockwise direction whereby the abutment 55 of the arm 42 moves away from the pin 45. The clockwise pivotal movement of the carrier 47 is terminated when the driving element 6 reaches and frictionally engages the outer side of the outermost convolution 3a to rotate the film roll and the core 1 in a clockwise direction.

The leader 21 of the convolution 3a engages the concave surface of the tip 22 not later than in response to completion of a full revolution of the core 1, and the leader is then caused to move lengthwise in the path 34 between the film directing surfaces 23, 33 to enter the channel 25 of the fixed guide assembly 24. The leaf spring 56 of the assembly 24 causes the film portion behind the leader 21 to form a loop and the leader thereupon reaches and moves along the pull-down 57 whose claw enters the adjacent perforations and advances the film 3 lengthwise in stepwise fashion. The leader 21 ultimately reaches and is preferably automatically attached to the core of the takeup reel.

The driving element 6 can be disengaged from the film roll on the core 1 as soon as the leader 21 reaches the pull-down 57. The latter then takes over and causes the film to move toward the takeup reel and to place successive frames into registry with the gate, not shown. The disengagement of the driving element 6 and film directing member 20 from the film roll on the core 1 takes place in automatic response to relaxation of finger pressure upon the knob 51. The arm 52 is then returned into engagement with the stop 58. It is clear that the carrier 47 can be biased in a counterclockwise direction by a spring or the like.

An important advantage of the improved film threading mechanism is that it occupies less room than the presently known mechanisms or the mechanism of my copending application Ser. No. 82,606. This is attributed to the fact that the film directing members 20, 35 are pivotable about a common axis and that neither of these members need form a straight elongated rail. The compactness of the improved film threading mechanism is important in many types of motion picture projectors wherein the space is at a premium and wherein it is desirable that the film directing members should not have to move to positions at a considerable distance from the outermost convolution of the roll of film on the supply reel, even at such times when the film threading mechanism is not in use. A compact film threading mechanism enables the manufacturer to design for the motion picture projector a housing which is of eye-pleasing appearance and can be stored in a small box or carrying case.

Another important advantage of the improved film threading mechanism is that its film directing members 20, 35 are just as effective (in that they can properly direct the leader of the film into the stationary film guide assembly) as the film directing members of my aforementioned copending application despite the fact that the members 20, 35 are mounted for pivotal rather than reciprocatory movement.

A further important advantage of the improved film threading mechanism is that the film directing members 20, 35 can be mounted on a common carrier 47 pivotable about the axis of a part (shaft 10) which not only serves as a fulcrum for the carrier but can also perform other useful function or functions, such as supporting the pulley 9 and transmitting torque from the motor 11 to the driving element 6. The film directing member 35 need not be guided at all and the other film directing member 20 can be guided in a part (40) which can constitute an important component of the fixed film guide assembly. Still further savings in material and space are achieved by placing the shaft 10 ahead of the film directing members 20, 35 and driving element 6 (as considered in the direction of rotation of the core 1 to pay out the film 3) and by mounting the driving element 6 on the carrier 47 for the film directing members.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a cinematographic apparatus, a combination comprising a housing; a supply of convoluted film rotatably supported by said housing and having a leader constituting the free end of the outermost convolution of such supply; and a film threading mechanism, comprising drive means for rotating said supply in a direction to pay out the film, first film directing means having a film engaging portion pivotable about a predetermined axis against the outermost convolution of said supply and a first film directing surface arranged to guide the leader subsequent to engagement between the leader and said film engaging portion while said drive means rotates said supply in said direction, and second film directing means pivotable toward said outermost convolution about said axis and having a second film directing surface defining with said first surface a path wherein said leader is advanced in a predetermined direction in response to rotation of said supply.

2. A combination as defined in claim 1, wherein said drive means comprises a driving element which is movable into and out of engagement with the outermost convolution of said supply, said second film directing means being disposed between said driving element and said first film directing means.

3. A combination as defined in claim 1, wherein said film threading mechanism further comprises a common carrier for said first and second film directing means, said carrier being pivotable with both said film directing means about said predetermined axis.

4. A combination as defined in claim 3, wherein said carrier comprises first and second portions respectively connected to said first and second film directing means, said first portion being rigid with said second portion.

5. A combination as defined in claim 3, wherein said film threading mechanism further comprises actuating means for pivoting said carrier about said predetermined axis.

6. A combination as defined in claim 1, wherein said drive means comprises a motor, a rotary driving element movable into and out of engagement with the outermost convolution of said supply, and a power train connecting said motor with said driving element, said power train comprising a rotary member defining said predetermined axis.

7. A combination as defined in claim 6, wherein said rotary member is a shaft driven by said motor and arranged to transmit torque to said driving element.

8. A combination as defined in claim 6, further comprising a common carrier for said first and second film directing means, said carrier being pivotable about said predetermined axis and said driving element being mounted on said carrier at a point remote from said predetermined axis.

9. A combination as defined in claim 8, wherein said driving element comprises a friction wheel.

10. A combination as defined in claim 1, wherein one of said film directing means is movable within predetermined limits with reference to the other film directing means.

11. A combination as defined in claim 10, wherein said film threading mechanism further comprises a carrier supporting said first and second film directing means and being pivotable about said predetermined axis and wherein said one film directing means is said first film directing means, and resilient means for yieldably urging said first film directing means to a predetermined forward position in which said first film directing means remains during pivotal movement of said carrier in a direction to move said first film directing means into engagement with the outermost convolution of said supply.

12. A combination as defined in claim 11, wherein said drive means comprises a rotary driving element which is mounted on and movable by said carrier into engagement with the outermost convolution of said supply, said driving element being arranged to engage the outermost convolution ahead of said first film directing means and said resilient means being arranged to yield and to permit movement of said second film directing means and said driving element with reference to said first film directing means while said carrier continues to pivot in a direction to move said driving element into engagement with said outermost convolution.

13. A combination as defined in claim 12, further comprising stationary guide means for said first film directing means for guiding said first film directing means at least during a portion of pivotal movement of said first film directing means toward said outermost convolution.

14. A combination as defined in claim 1, in which said predetermined axis is located ahead of said first and second film directing means as considered in the direction of rotation of said supply to pay out the film.

References Cited

UNITED STATES PATENTS

| | | | |
|---|---|---|---|
| 3,550,879 | 12/1970 | Bundschuh | 242—195 |
| 3,550,881 | 12/1970 | Roman | 352—157 X |
| 3,429,518 | 2/1969 | McKee | 352—158 X |

SAMUEL S. MATTHEWS, Primary Examiner

M. H. HAYES, Assistant Examiner

U.S. Cl. X.R.

242—192, 195